UNITED STATES PATENT OFFICE.

WALTER OVEREND, OF FINSBURY PARK, ENGLAND, ASSIGNOR TO OVEREND ALUMINIUM SOLDERING PROCESSES, LIMITED, OF AUCKLAND, NEW ZEALAND.

SOLDERING OF ALUMINIUM OR ALUMINIUM ALLOYS.

1,233,803. Specification of Letters Patent. Patented July 17, 1917.

No Drawing. Application filed April 24, 1916. Serial No. 93,350.

*To all whom it may concern:*

Be it known that I, WALTER OVEREND, a subject of the King of Great Britain and Ireland, residing at Finsbury Park, county of Middlesex, England, have invented new and useful Improvements in or in Connection with the Soldering of Aluminium or Aluminium Alloys, of which the following is a specification.

This invention has relation to the soldering of aluminium or of aluminium alloys. The invention has reference to the preparation of the surface of the aluminium or of the aluminium alloy prior to soldering. The invention also has reference, in particular, to the soldering of aluminium or of aluminium alloy to aluminium or aluminium alloy, and further has reference to the soldering of aluminium or of aluminium alloy to another metal or alloy. The processes heretofore proposed and practised for soldering aluminium or aluminium alloy either to aluminium or aluminium alloy or to another metal or alloy have not given satisfactory results as the soldered portions were not durably resistant. The present invention has therefore for objects to provide an improved process of preparing the surface of the aluminium or of the aluminium alloy prior to soldering and an improved process of soldering aluminium or aluminium alloy whereby aluminium or aluminium alloy may be easily, and in a durably resistant manner, united to aluminium or aluminium alloy or to another metal or alloy.

The process of soldering aluminium or aluminium alloy, hereinafter referred to as aluminium, to aluminium or to another metal or alloy, hereinafter referred to as another metal or other metal, is, in accordance with this invention and as has been proposed, divided into two steps or operations, the first step or operation consisting in preparing the surfaces of the aluminium or other metal prior to soldering and comprising a tinning operation, and the second step or operation a uniting operation. The alloys employed in the first or tinning step or operation in connection with aluminium, comprise (1) an alloy of tin and zinc and (2) an alloy of tin and cadmium. The first or tinning step or operation in connection with a metal other than aluminium may be effected in any well known manner and any well known solder, for example, ordinary tinman's solder may be employed, but it is preferred to use the alloy last mentioned and consisting of tin and cadmium.

In carrying out the present invention it is essential when preparing the surface of the aluminium and when uniting aluminium to aluminium or to another metal that stearic acid be used as the flux and that the stearic acid be used alone and not in admixture with any other material or matter as has been proposed. Further it is essential that the first or tinning step or operation in connection with aluminium be carried out at a temperature of between 750° and 800° F., that is to say, at a temperature which is not so great as to cause the aluminium to collapse in the relatively short time during which heat is applied thereto, or which will cause the stearic acid to decompose. It is also essential in applying the firstly mentioned alloy to aluminium that a special tool be employed; this tool is, preferably, employed in applying the secondly mentioned alloy although any ordinary soldering bit may be used. This special tool comprises a strip or piece of zinc, such as commercial sheet zinc.

The process of preparing the surface of aluminium prior to soldering consists, according to this invention, in heating the aluminium, applying thereto the flux consisting of stearic acid and then the firstly mentioned alloy consisting of tin and zinc, raising the temperature of the aluminium and alloy to such a degree that the alloy melts, and maintaining the heating while gently rubbing the surface of the aluminium and distributing the molten alloy with the special tool mentioned, said tool acting on the coating of oxid on the surface of the aluminium and causing it to separate therefrom and mix with the molten alloy, said action being carried out at or above a temperature at which the tool melts, with the result that the surface of the aluminium from which the coating of oxid has been removed is covered or alloyed with a coating consisting wholly, or practically wholly, of tin, the surplus alloy then being wiped off or otherwise removed and then either continuing the heating, or reheating if the heating has been discontinued, the coated aluminium and applying the secondly mentioned alloy, using stearic acid as a flux, so that the aluminium at the end of the preparatory process is covered or alloyed with a mixture consisting wholly, or practically wholly, of tin and cadmium.

From the foregoing description of the first or tinning step or operation, it will be understood that at the completion thereof the aluminium is coated with a homogeneous layer consisting wholly, or practically wholly, of tin and cadmium, which, at the surfaces of contact, is alloyed with aluminium. It is essential in the carrying out of the preparatory process that the coating of the secondly mentioned alloy be applied immediately. It will also be understood that the special tool employed differs from the ordinary soldering bit which is used to conduct or apply heat to the solder and the article to be soldered. In the present invention no such action takes place and the special tool is subjected to such a temperature that it is gradually melted away in the carrying out of the process. The invention is thus differentiated from known processes of soldering and from a proposed process of preparing the surface of aluminium prior to soldering with a tin-cadmium alloy, in which an alloy consisting of tin and zinc is applied to the surface of the aluminium and the aluminium and the applied alloy are then heated to a degree just sufficient to melt the alloy and then allowed to cool so that crystals form, the alloying of the tin and zinc with the aluminium being assisted or caused by means of a rubber made of a material which is not affected at the temperatures employed.

In the carrying out of the second or uniting step or operation the tinned aluminium or other tinned metal are soldered together using, if necessary, further alloy or solder and consisting, preferably, and as already mentioned, of the tin and cadmium either by sweating one with the other or by means of any recognized method of soldering, stearic acid being used as the flux. The additional alloy or solder, if used in the second or uniting step or operation, may comprise any well known solder, for example, tinman's solder, in lieu of the alloy mentioned.

The tin and zinc of the firstly mentioned alloy may be present therein in various proportions, but it is preferred to use an alloy consisting of two parts of tin to one of zinc. Similarly the constituents of the secondly mentioned alloy may be present in various proportions and in practice good results have been obtained with alloys containing proportions of tin varying from four to one to, in each case, one of cadmium.

In the preparation of the alloys it is important that they be as pure as is possible when using metals in the commercial state of purity, and when melted for the purpose of mixing to form the alloy, that the dross and other impurities which rise to the top of the molten mass be removed. The removal of the dross and other impurities, as also the mixing of the molten metals, is assisted by the addition of a little stearic acid.

What I claim is:—

1. The process of soldering aluminium, consisting in first preparing the surfaces by heating same and applying a flux of stearic acid, then applying an alloy of tin and zinc and fusing said alloy on to the surface coincidently rubbing same with a piece of zinc, the temperature being such as to fuse the zinc, then removing all surplus alloy, then applying to the prepared surface a soldering alloy and finally sweating or soldering the prepared surfaces.

2. The process of soldering aluminium, consisting in first preparing the surfaces by heating same and applying a flux, then applying an alloy of tin and zinc and fusing said alloy on to the surface coincidently rubbing same with a piece of zinc, the temperature being such as to fuse the zinc, then removing all surplus alloy, then applying to the prepared surface an alloy of tin and cadmium, and finally sweating or soldering the prepared surfaces.

3. The process of soldering aluminium, consisting in first preparing the surfaces by heating same and applying a flux of stearic acid, then applying an alloy of tin and zinc and fusing said alloy on to the surface at a temperature of between 750° and 800° Fahrenheit coincidently rubbing the alloy on to the surface with a zinc tool and effecting the removal of the oxid on the aluminium surface, then removing the surplus alloy, then applying to the prepared surface a soldering alloy with a flux of stearic acid and finally sweating or soldering the prepared surfaces together.

4. The process of soldering aluminium, consisting in first preparing the surfaces by heating same and applying a flux of stearic acid, then applying an alloy of tin and zinc and fusing said alloy on to the surface at a temperature of between 750° and 800° Fahrenheit coincidently rubbing the alloy on to the surface with a zinc tool and effecting the removal of the oxid on the aluminium surface, then removing the surplus alloy, then applying to the prepared surface an alloy of tin and cadmium with a flux of stearic acid and finally sweating or soldering the prepared surfaces together.

5. In the process of preparing the surface of aluminium prior to soldering, applying a tin alloy to said surface and maintaining the same in a molten state thereon, and rubbing the surface of the aluminium while covered by the molten alloy with a piece of zinc in the presence of a temperature at or above the melting point of zinc, substantially as described.

Dated this 10th day of April, 1916.

WALTER OVEREND.